United States Patent [19]

Schramm

[11] 4,179,938
[45] Dec. 25, 1979

[54] DUAL INDICATING TACHOMETER APPARATUS

[76] Inventor: Jack B. Schramm, 5218 Mulford, Skokie, Ill. 60076

[21] Appl. No.: 893,942

[22] Filed: Apr. 6, 1978

[51] Int. Cl.² ............................................. G01P 3/04
[52] U.S. Cl. ................................. 73/510; 235/103.5 R
[58] Field of Search ...................... 73/510; 116/37, 38, 116/57, 114 AJ, 136.5, 116, 124 M, 129 AB, 129 E, 129 S, 129 T, DIG. 20, DIG. 37; 340/52 F, 263, 264; 350/110; 235/103.5 R; 324/161

[56] References Cited

U.S. PATENT DOCUMENTS

| | | | |
|---|---|---|---|
| 1,629,680 | 5/1927 | Cooke | 350/110 X |
| 2,879,940 | 3/1959 | Cornell | 235/103.5 R |
| 3,212,707 | 10/1965 | Ayers | 73/510 X |
| 3,537,002 | 10/1970 | Hanen et al. | 324/161 X |

FOREIGN PATENT DOCUMENTS 158935  2/1921  United Kingdom ............ 235/103.5 R
201405  8/1923  United Kingdom ............ 235/103.5 R Primary Examiner—Anthony V. Ciarlante
Attorney, Agent, or Firm—Alter and Weiss

[57] ABSTRACT

A dual indicating tachometer apparatus for utilization with ground vehicles such as automobiles and trucks for differentiating between the rotational speeds of the engine and clutch shaft of the vehicle. Two sensing devices are utilized with one monitoring the engine rotation speed of the vehicle while the other monitors the rotational speed of the clutch shaft. Either mechanical dial or digital electronic display means are utilized to expose to the user of such a vehicle the difference between the rotating speeds of the two vehicle elements in order to advise the user of the operating characteristics of the vehicle itself and to facilitate for the user the shifting of the vehicle's transmission. Means are also provided for displaying the respective rotating speeds of the measured elements as well as for indicating the difference in rotational speeds therebetween.

3 Claims, 8 Drawing Figures

U.S. Patent    Dec. 25, 1979    4,179,938
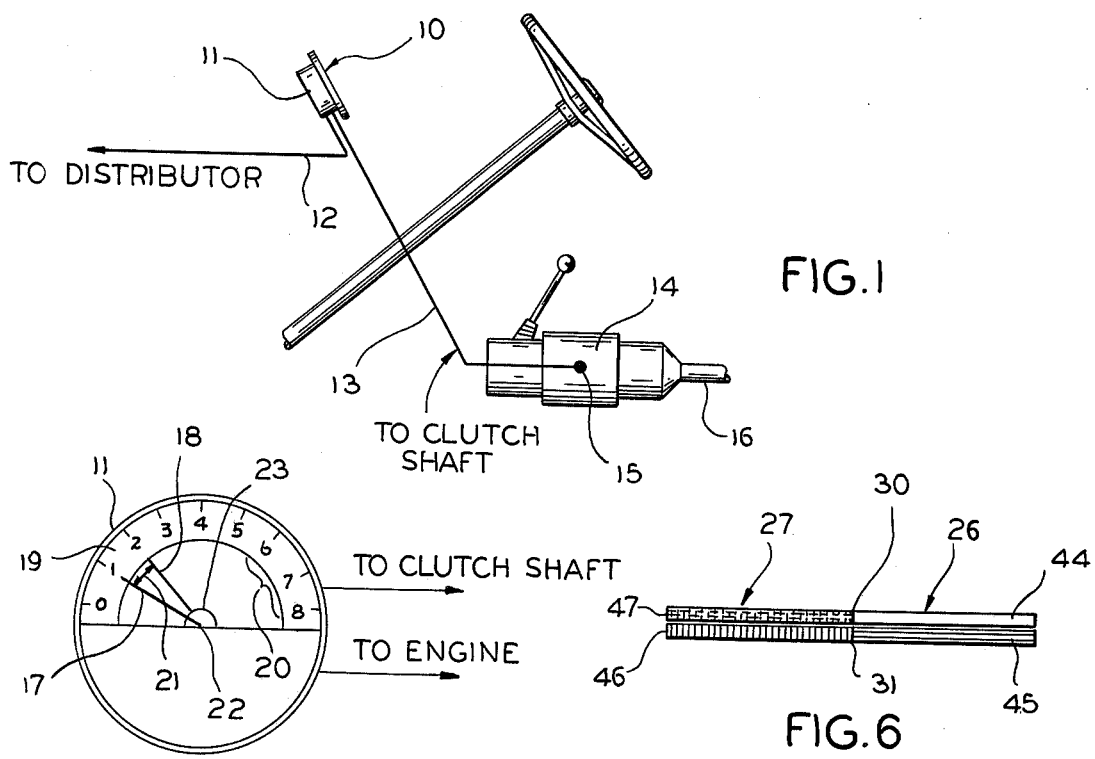
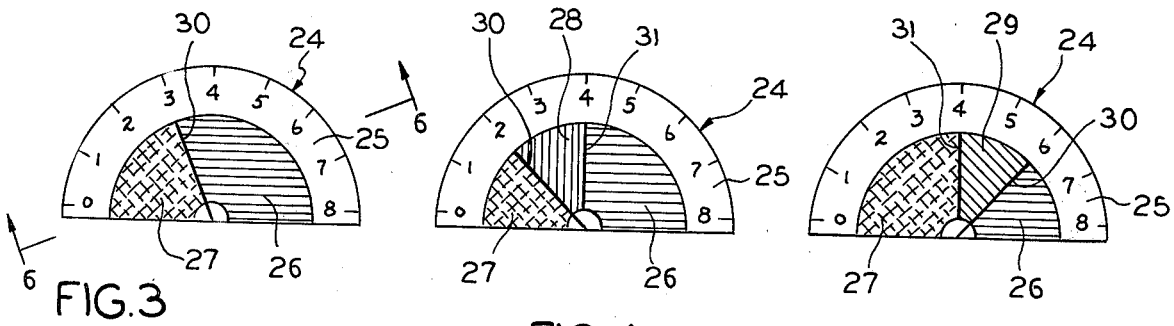
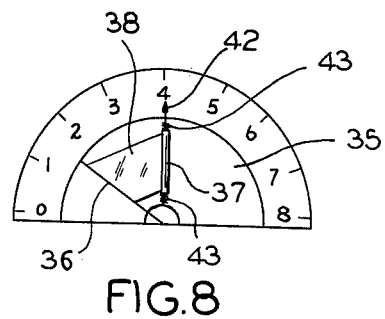

DUAL INDICATING TACHOMETER APPARATUS

BACKGROUND OF THE INVENTION

The present invention relates in general to vehicle analyzing equipment and in particular to a dual indicating tachometer for displaying differences between the rotational speed of the vehicle's engine and the vehicle's clutch shaft.

While many various types of tachometer-type monitoring and display devices exist today, few if any, direct themselves to the monitoring and measurement of a vehicle's operating characteristics in more than one location on a single power transmission circuit. Additionally, few, if any such devices, attempt to provide a display media for the user of such a vehicle in which the operating characteristics of two or more elements within the power transmission circuit are conveniently and effectively compared so that the user, at a glance, can immediately be apprised of the vehicle's operating characteristics.

It is thus an object of the present invention to provide a dual indicating tachometer for utilization with the vehicle in order to differentiate quickly and easily between the rotating speeds of the engine and the clutch shaft of the vehicle.

It is further an object of the present invention to provide a facilitated display apparatus which quickly and effectively discloses the differences in the operating speeds of the elements to the user so that a user can have an immediate interpretation of the rotating speed differences.

It is also an object of the present invention to provide an effective dual indicating tachometer apparatus to identify the proper time in which to shift gears on a manual transmission vehicle.

Further it is an object of the present invention to provide a dual indicating apparatus so as to inform the user of the clutch operation and efficiency of the vehicle in order to minimize clutch wear.

It is also an object of the invention to provide an excellent training aid for drivers just learning how to drive manual shift vehicles through the capabilities described herein.

These and other objects of the invention will become apparent in light of the present specification.

SUMMARY OF THE INVENTION

The present invention is a dual indicating tachometer for use with vehicles such as cars or trucks to differentiate between the rotational speeds of the vehicle's engine and the vehicle's clutch shaft. The apparatus comprises first tachometer sensing means which are operably attached to the engine of the vehicle for monitoring the rotational speed of the engine as well as second tachometer sensing means operably attached to the clutch shaft of the vehicle for monitoring the rotational speed of the clutch shaft. Portions of the first and second tachometer sensing means join one another at sensing joiner means for coordination and to enable comparison of the respective rotating values monitered by the first and second tachometer sensing means. Indicating means are operably connected to the sensing joiner means to clearly and accurately display to a user of the vehicle, differences between the rotational speeds of the engine and the rotational speed of the clutch shaft. The apparatus thus informs a user of the efficiency of torque transmission from the engine to the clutch shaft and in turn the clutch shaft for, among other things, transmission shifting therebetween.

The preferred embodiment of the invention further comprises rotation speed display means for displaying the actual rotational speeds of both the engine and the clutch shaft respectively to apprise the user of the individual speeds as well as the difference between them.

In one embodiment of the invention the joinder means comprises a concentric coupling device wherein one of the first or second sensing means is operably attached to an inner coupling portion while the other of the sensing means is operably attached to the outer coupling portion. The outer coupling portion is freely rotatable about the inner coupling portion to permit the independent display of the respective rotational speeds through rotation speed display means.

In the preferred embodiment of the invention, the rotation speed display means comprises a first indicator pointer attached to the outer coupling portion and a second indicator pointer attached to the inner coupling portion of the joinder means. Each of the first and second indicator pointer means is enclosed with the joinder means within an apparatus housing and each of the indicator pointer means is positioned in front of a common calibrated dial to represent the speeds of the engine and clutch shaft respectively. The indicating means for displaying the difference between the speeds of the engine and clutch shaft comprises the exposed portion of the dial when the first and second indicator pointers are not in alignment and thus when the engine and clutch shaft rotation speeds are not equal. In order to distinguish the respective speed values and sources for each of the revolution speeds indicated by the pointer, the first indicator pointer may have a noticeably different shape from the shape of the second indicator pointer or alternatively the first indicator pointer may be of a different color from the color of the second indicator pointer.

In another embodiment of the invention, the indicating means further comprises spring-loaded flag means operably interposed between the first and second indicator pointers. These flag means become increasingly exposed to the user as the difference between the engine and clutch shaft speeds increase which, in turn, increases the the distance between the first and second pointers. The flag means are alternatively capable of being springedly withdrawn as the first and second pointers approach alignment as said engine and clutch shaft rotation speeds approach one another. One of the indicator pointer means preferably has rolled about it under spring force the flag means, on the free end of which is attached the other pointer in order to facilitate the operation of the flag means as the pointers are pulled apart and towards one another alternatively.

The preferred embodiment of the invention utilizes indicator means in which the first indicator pointer is incorporated into a substantially transparent first disc means. A portion of the first disc to the right of the pointer is of one color and the portion of the first disc to the left of the pointer is in a second color. The second indicator pointer means is also incorporated equivalently into a substantially transparent second disc. This second disc means is substantially juxtaposed to the first disc means and a portion of the second disc means to the right of the second pointer is in a third color while the portion of the second disc means to the left of the second pointer is in a fourth color. The juxtaposed discs create a fifth color between the first and second pointers when the engine speed is greater than the clutch shaft speed and equivalently the juxtaposed discs create a sixth color between the first and second pointers when the engine speed is less than the speed of the clutch shaft.

In the particular embodiment where transparent discs are utilized with the indicator pointers, the invention preferably utilizes the first disc and pointer to display the rotational speed of the engine while the second disc and pointer display the rotational speed of the clutch shaft. Preferably, the first color would be clear, the second color yellow, the third color blue, and the fourth color red. Through such a utilization of particular colors in juxtaposition to one another through incorporation onto the first and second discs respectively, a fifth color, green, is created when the second color overlaps the third color. A sixth color, red, is created when the first color overlaps the fourth color. The extent of green color indicates the amount of difference between the rotating clutch shaft and a faster rotating engine while the extent of red color indicates the amount of difference between the rotating engine and a faster rotating clutch shaft.

The first and second tachometer sensing means may be electronic sensing means attached to the engine and clutch shaft respectively so as to monitor the tachometer signal devices thereon or they could be mechanically rotated cable devices operably attached to the engine and clutch shaft and driven by tachometer gearing means.

In yet another embodiment of the invention, the sensing joinder means comprise an electronic calculator for determining the rotational speed difference between the engine and clutch shaft as determined from monitored input from the first and second tachometer sensing means respectively. Preferably, this embodiment would have indicating means comprising an electronic display capable of showing the rotational speed difference derived by the calculating means as well as having means to describe the alternative conditions of greater engine speed or greater clutch shaft speed to the user. Through the utilization of light emitting diodes just such an electronic display would be capable of showing the rotational speed difference and, through the utilization of plus and minus indicators, also formed of light emitting diodes, the device would be capable of describing which particular vehicle component, the engine or clutch shaft, was rotating at a faster speed.

BRIEF DESCRIPTION OF THE DRAWINGS

FIG. 1 of the drawing is a side schematic view of the Dual Indicating Tachometer apparatus as utilized in a vehicle showing particularly the arrangement for the first and second tachometer sensing means;

FIG. 2 is a front elevational view of the apparatus housing showing particularly the first and second indicator pointer means as displayed before the common calibrated dial;

FIG. 3 is a front elevational view of the aligned first and second indicator pointers of the embodiment in which such pointers are incorporated into substantially transparent discs;

FIG. 4 is a front elevational view of the same embodiment of FIG. 3 in which the indicator pointer denoting the speed of the rotating clutch shaft shows a faster rotation than that of the engine;

FIG. 5 is a front elevational view of the embodiment of FIG. 3 in which the indicator pointer for denoting the speed of the engine shows a faster engine rotation than that of the rotating clutch shaft;

FIG. 6 is a bottom cross-sectional view taken along lines 6—6 of FIG. 3 and looking in the direction of the arrows, showing particularly the juxtaposition of the first and second indicator discs and the utilization of two different colors in each of the two discs;

FIG. 7 is a front elevational view of the embodiment of the invention in which an electronic display shows the rotational speed differences between the engine and clutch shaft; and FIG. 8 is a front elevational view of one embodiment of the invention in which spring-loaded flag means are operably interposed between the first and second indicator pointers.

DETAILED DESCRIPTION OF THE DRAWINGS

While this invention is susceptible of embodiment in many different forms, there is shown in the drawings and herein be described in detail several specific embodiments with the understanding that the present disclosure is to be considered as an exemplification of the principals of the invention and is not intended to limit the invention to the embodiments illustrated.

The Dual Indicating Tachometer Apparatus is shown in FIG. 1 as having apparatus housing 11 with first tachometer sensing means 12 to an engine distributor, for monitoring the rotational speed of the engine. Second tachometer sensing means 13 monitors the rotational speed of the clutch shaft positioned before the shiftable gears by monitoring the rotation of the vehicle clutch shaft at 15 in transmission housing 14.

Housing 11 in FIG. 2 is shown to contain first and second indicator pointer means 17 and 18 respectively as well as common calibrated dial 19 with calibrations such as markings 20. As can be seen in FIG. 2 joinder means are utilized, here in the center of dial 19 and comprise outer coupling portion 23 and inner coupling portion 22. Indicator pointer means 17 are attached to the joinder means at inner coupling portion 22 while indicator pointer means 18 is attached to the coupling means at outer coupling portion 23. The indicating means for displaying the difference between the rotational speed of the engine shown by first indicator means 17 and the rotational speed of the clutch shaft shown by second indicator pointer means 18, comprises the exposed portion 21 of the dial, when the first and second indicator pointers are not in alignment and thus when the engine and clutch shaft speeds are unequal.

The embodiment of the invention utilizing the substantially transparent juxtaposed discs is shown in FIG. 3 in which engine rotation indicator 30 is in alignment with clutch shaft rotation indicator pointer 31 (not shown). The apparatus 24 having common calibrated dial 25 enables the display of both the engine and clutch shaft rotation speeds through the display presented by the indicator pointers to a user. As previously discussed, pointer 30, in the preferred embodiment, is incorporated into a substantially transparent first disc which is red to the left of pointer 30 and clear to the right of pointer 30. Although not shown in FIG. 3, as seen in FIGS. 4 through 6, pointer 31 is similarly incorporated into a substantially transparent disc which is yellow to the left of the pointer and blue to the right of the pointer. Accordingly, as shown in FIG. 3 when the pointers are aligned and the discs are juxtaposed to one another for independent rotation relative to one another, the region to the left of the aligned pointers is orange (formed by the combination of yellow and red) and the area to the right of the pointers is blue (formed by the combination of the clear portion of the first disc over the blue portion of the second disc).

As shown in FIG. 4 when the rotating speed of the clutch shaft is greater than that of the engine pointer 31 will of course indicate a larger rotational speed on dial 25 of apparatus 24. At such time that indicator 31 and the integrated disc having the previously mentioned colors overruns the rotating speed of engine indicator pointer 30, the difference or extent to which pointer 31 exceeds the value of indicator 30 appears as red region 28 interposed between orange region 27 and blue region 26.

Alternatively, when engine rotation speed indicator 30 overruns clutch shaft rotation speed indicator 31 as shown in FIG. 5, green region 29 is displayed between orange region 27 and blue region 26. Green region 29 is formed by the overlapping of a portion of the yellow disc to the left of indicator 30 onto a portion of the blue disc to the right of indicator 31. In simpler terms, a red display will indicate clutch shaft overrun while a green region indicates engine overrun.

Through a facilitated display construction as herein described, the user of the vehicle can immediately determine, through minimal familiarity, which vehicle element is rotating faster than the other vehicle element for purposes of either shifting upwardly into a higher gear or down-shifting into a lower gear. It should be realized that it is well within the scope of the invention to alternatively reverse the connection procedure if it is desired to display red during engine overrun and green during clutch shaft overrun.

In FIG. 6 a cross sectional view of juxtaposed discs taken along lines 6—6 of FIG. 3 and looking in the direction of the arrows is shown. As can be seen an orange display 27 is provided when substantially transparent disc portion 47 which is yellow directly overlaps disc portion 46 which is red and a blue display 26 arrises when clear portion 44 to the right of indicator pointer 30 overlaps blue portion 45 to the right of indicator pointer 31.

As has been discussed, an electronic display may be utilized to denote the difference in speeds between the clutch shaft and the engine. With reference to FIG. 7 a light emitting diode display 39 is shown displaying the revolution speed difference 41 as well as alternative condition indicator 40, which for example, would display a plus sign when the engine overruns the clutch shaft and a minus sign when the drive shaft overruns the engine in revolution speed. The actual value 41 indicating the difference between the rotating speeds of the clutch shaft and engine are computed by an electronic calculator comprising the sensing joiner means which monitors input from the first and second tachometer sensing means to in turn calculate the difference in revolutions therebetween.

An alternative embodiment of the invention is shown in FIG. 8 in which the indicating means comprise a spring-loaded flag 38 rolled about indicator pointer 37. Spring-loaded force on one side of flag 38 is obtained through spring 43. The other side of flag 38 is restrainably affixed to the other indicator pointer 36 so as to increasingly expose the spring loaded flag 38 when the pointers 36 and 37 are increasingly spaced apart. Preferably, pointer 37 also includes pointer tip 42 so as to facilitate the exact determination of the rotating speed of the vehicle element which pointer 37 indicates. For example, if indicator pointer 37 displays the rotating speed of the engine and pointer 36 indicates the rotating speed of the clutch shaft, the extent to which flag 38 is unveiled in front of calibrated dial 35 indicates, quite readily, the extent to which the engine is overrunning the clutch shaft rotation speed. It should be realized that through such a mechanical configuration, if and when the clutch shaft rotating speed and indicator overruns the engine speed and engine speed indicator, the flag would still be unveiled although it would be the reverse side of the flag which would be exposed. Accordingly, in the preferred embodiment as described herein, one side of the flag would be of one color such as red while the other side of the flag would be of another color, green, for example, to easily display to the user differences in operating conditions as to when the engine overruns the clutch shaft or alternatively the clutch shaft overruns the engine.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A dual-indicating tachometer apparatus for use with a vehicle to differentiate between the rotational speeds of an engine and clutch shaft of said vehicle, said apparatus comprising:

first tachometer sensing means operably attached to the engine of said vehicle for monitoring the rotational speed of said engine;

second tachometer sensing means operably attached to the clutch shaft of said vehicle for monitoring the rotational speed of said clutch shaft;

sensing joinder means at which both said first and second sensing means terminate for co-ordination between said sensing means as well as comparison of said respective rotating values;

said joinder means comprising concentric coupling device wherein one of said first or second sensing means is operably attached to an inner coupling portion while said other of said first or second sensing means is operably attached to an outer coupling portion;

said outer coupling portion freely rotatable about said inner coupling portion to permit the independent display of said respective rotational speeds through said rotation speed display means;

indicating means operably connected to said sensing joinder means for clearly and accurately displaying to a user of said vehicle the differences between the rotational speeds of said engine and clutch shaft thereby assisting and informing said user as to the efficiency of torque transmission from said engine to said clutch shaft for transmission shifting therebetween;

rotation speed display means for displaying the actual rotational speeds of both said engine and clutch shaft respectively thereby apprising said user of the respective speeds as well as the difference between speeds;

said rotation speed display means comprising a first indicator pointer means attached to said outer coupling portion and a second indicator pointer means attached to said inner coupling portion of said joinder means;

each of said first and second indicator pointer means being enclosed with said joinder means in an apparatus housing;

each of said first and second indicator pointer means positioned in front of a common calibrated dial, to represent the speeds of said engine and clutch shaft respectively, said indicating means for displaying said differences in speeds comprising an exposed portion of said dial when said first and second indicator pointers are not in alignment and thus when the rotational speeds of said engine and clutch shaft speeds are unequal;

said indicating means further comprising spring loaded flag means operably interposed between said first and second indicator pointers, said flag means being increasingly exposed to said user as the difference between said engine and clutch shaft speeds increase to in turn increase the distance between said first and second pointers, and said flag means alternatively capable of being springedly withdrawn as said first and second pointers approach alignment as said engine and clutch shaft rotation speeds approach one-another.

2. A dual-indicating tachometer apparatus for use with a vehicle to differentiate between the rotational speeds of an engine and clutch shaft of said vehicle, said apparatus comprising:

first tachometer sensing means operably attached to the engine of said vehicle for monitoring the rotational speed of said engine;

second tachometer sensing means operably attached to the clutch shaft of said vehicle for mointoring the rotational speed of said clutch shaft;

sensing joinder means at which both said first and second sensing means terminate for co-ordination between said sensing means as well as comparison of said respective rotating values;

said joinder means comprising a concentric coupling device wherein one of said first or second sensing means is operably attached to an inner coupling portion while said other of said first or second sensing means is operably attached to an outer coupling portion;

said outer coupling portion freely rotatable about said inner coupling portion to permit the independent display of said respective rotational speeds through said rotation speed display means;

indicating means operably connected to said sensing joinder means for clearly and accurately displaying to a user of said vehicle the differences between the rotational speeds of said engine and clutch shaft thereby assisting and informing said user as to the efficiency of torque transmission from said engine to said clutch shaft for transmission shifting therebetween;

rotation speed display means for displaying the actual rotational speeds of both said engine and clutch shaft respectively thereby apprising said user of the respective speeds as well as the difference between speeds.

said rotation speed display means comprising a first indicator pointer means attached to said outer coupling portion and a second indicator pointer means attached to said inner coupling portion of said joinder means;

each of said first and second indicator pointer means being enclosed with said joinder means in an apparatus housing;

each of said first and second indicator pointer means positioned in front of a common calibrated dial, to represent the speeds of said engine and clutch shaft respectively, said indicating means for displaying said differences in speeds comprising an exposed portion of said dial when said first and second indicator pointers are not in alignment and thus when the rotational speeds of said engine and clutch shaft are unequal;

said first indicator pointer means incorporated into a substantially transparent first disc means;

said portion of said first disc means to the right of said first pointer in a first color;

said portion of said first disc means to the left of said first pointer in a second color;

said second indicator pointer means incorporated into a substantially transparent second disc means;

said second disc means being juxtaposed to said first disc means;

said portion of said second disc means to the right of said second pointer in a third color;

said portion of said second disc means to the left of said second pointer in a fourth color;

said juxtaposed discs creating a fifth color between said first and second pointers when said engine speed is greater than said clutch shaft speed; and said juxtaposed discs creating a sixth color between said first and second pointers when said engine speed is less than said clutch shaft speed.

3. The invention according to claim 2 in which said first disc and pointer display the rotational speed of said engine, said second disc and pointer displaying the rotational speed of said clutch shaft;

said first color being clear, said second color being yellow, said third color being blue said fourth color being red, said created fifth color being green from said second color overlapping said third color, said created sixth color being red from said first color overlapping said fourth color, the extent of said green color indicating the amount of rotational difference between the faster rotating engine and said clutch shaft;

the extent of said red color indicating the amount of rotational difference between the faster rotating clutch shaft and said engine.

* * * * *